March 10, 1970  J. E. WHITE  3,500,260
PHASE SHIFTERS
Filed June 9, 1964
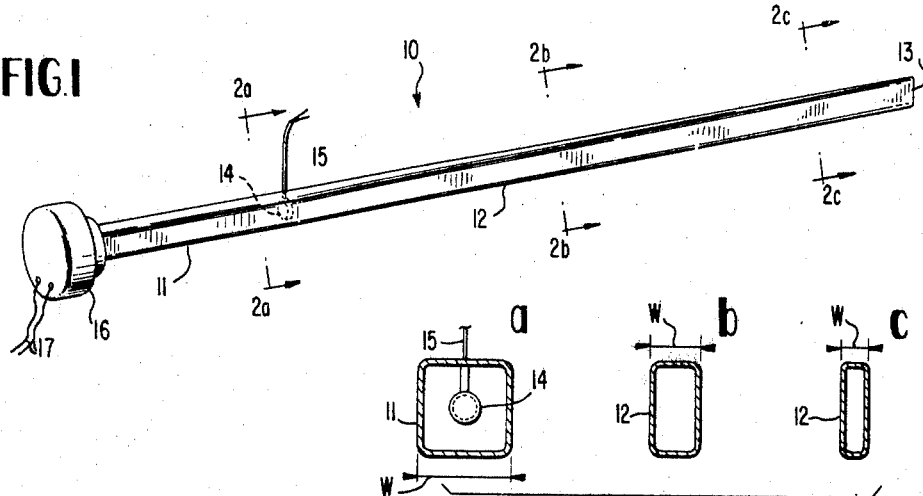
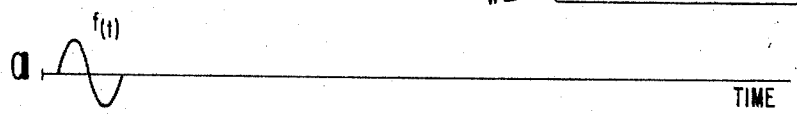
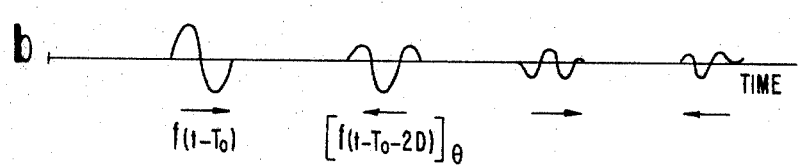
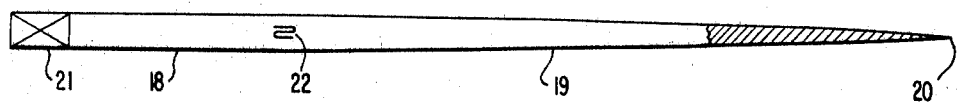
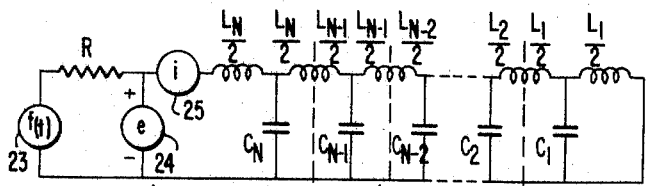
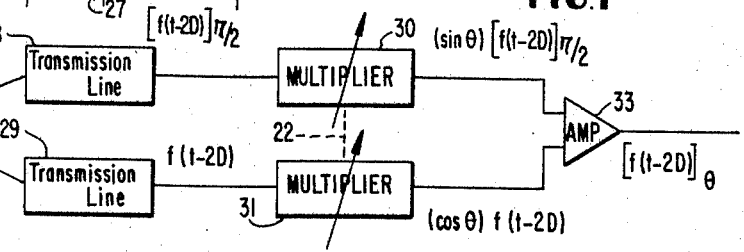
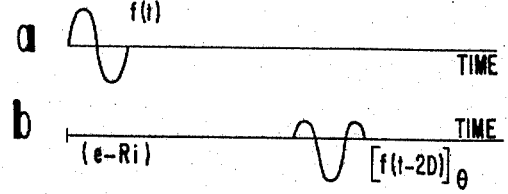
INVENTOR.
JAMES E. WHITE
BY
Leghne, Rothwell, Mion & Zinn
ATTORNEYS 3,500,260
PHASE SHIFTERS
James E. White, Littleton, Colo., assignor to Marathon Oil Company, Findlay, Ohio, a corporation of Ohio
Filed June 9, 1964, Ser. No. 373,684
Int. Cl. H03h 7/30
U.S. Cl. 333—30             11 Claims

ABSTRACT OF THE DISCLOSURE

A reflecting transmission line having a taper according to the equation $k = K(\sin A)^p$ phase shifts multiple frequencies of a composite signal the same amount. The parameter, $k$, which is tapered is varied in accordance with the sin A where A is proportional to the distance from the reflecting end.

---

The invention relates generally to phase shifters and more specifically, to methods and apparatus for modifying a given waveform by shifting each frequency component thereof through the same phase angle.

Heretofore, phase shifters have suffered from the inability to shift a wide band of frequencies without distorting the relative amplitudes of the different frequencies. The present invention overcomes this problem by providing a wave transmission line which is tapered in accordance with a certain formula to be explained below. Composite signals, which are signals comprising a number of frequencies, are applied to the transmission lines of my invention, travel the length of the line and are reflected at the reflecting end. Upon reflection, the signal travels back to the input end. The signal which has traveled the length of the transmission line twice is detected. The detected signal is thus delayed with respect to the input signal by an amount equal to twice the length of the transmission line, and contains each frequency of the input signal phase shifted by some predetermined amount. The relative amplitudes of the detected frequencies are the same as the relative amplitudes of the frequencies in the input signal.

A composite phase shifted signal is produced by transmitting a composite input signal to a detector via a reflecting transmission line which is tapered. My invention has applicability to tapered acoustical transmission lines, tapered mechanical transmission lines, tapered electrical transmission lines, and tapered electromagnetic transmission lines.

The transmission lines of my invention are tapered between the input end and the reflecting end by varying a selected parameter of the transmission line. That is, the selected parameter $k$, which may be either width, cross sectional area, or electrical inductance and capacitance is varied along the length of the transmission line in accordance with the formula $k_x = K(\sin A_x)^p$, where: $k_x$ is the value of the selected parameter at any point $x$ distance from the reflecting end, K is the value of the parameter at the input end of the transmission line, $A_x$ is a value which is proportional to the distance $x$, and $p$ is any desired number. The resulting phase shift imparted to a signal by the transmission line is $$\theta = p\frac{\pi}{2}$$

The parameter which is selected to be varied in accordance with the above formula depends on the type of transmission line used, e.g., for the acoustical transmission line, width or height is the selected parameter; for the mechanical transmission line, cross sectional area is the selected parameter; for the electrical transmission line, the inductances and capacitances are the selected parameters.

My invention further encompasses the use of two transmission lines for achieving a variable phase shifter.

It is therefore a primary object of my invention to provide a phase shifter for shifting each frequency component of a given waveform the same phase angle without changing the relative amplitudes of the frequencies.

A further object of my invention is to provide an acoustical transmission line for phase shifting a given waveform, the transmission line varying in width along its length.

Another object of my invention is to provide a mechanical phase shifter transmission line which varies in cross sectional area along its length and serves to phase shift a given waveform through a specific phase angle.

Another object of my invention is to provide an electrical transmission line which modifies a given waveform by shifting each frequency component by the same phase angle.

A further object of my invention is to provide a variable phase shifter for altering a given waveform by shifting each frequency component through a phase angle and providing a control for selecting the desired phase angle.

Other objects of my invention will be pointed out in the following detailed description and claims and illustrated in the drawing, in which:

FIGURE 1 shows an acoustical transmission line in accordance with my invention;

FIGURES 2a, 2b and 2c illustrate cross sectional views of the acoustical transmission line of FIGURE 1;

FIGURES 3a and 3b are time graphs, helpful to illustrate the operation of my invention;

FIGURE 4 shows a mechanical transmission line embodying my invention;

FIGURE 5 shows an electrical transmission line embodying my invention;

FIGURES 6a and 6b are time graphs helpful to explain the operation of FIGURE 5; and FIGURE 7 is a modification of my invention applicable for use with the transmission lines of FIGURES 1, 4, and 5, to provide variable phase shift.

In FIGURE 1 there is shown an acoustical transmission line 10 which is hollow and may be air-filled. It has an input end 11, a reflecting end 13, and a tapered portion 12 therebetween. A loud-speaker 16 is connected to apply the input waveform to the transmission line, and a detector 14, for example a microphone, is positioned at the junction of the input portion 11 and the tapered portion 12 to receive the phase shifted signal after reflection. Output leads 15 are connected to detector 14, and input leads 17 are connected to speaker 16.

I have found that by constructing the line 10 so that the width $w$ of the tapered portion 12 varies in accordance with $$\left[\sin\left(\frac{\pi}{2}\frac{x}{L}\right)\right]^p$$

a phase shift which is equal to $$\left(p\frac{\pi}{2}\right)$$

will be imparted to all frequencies of a signal waveform.

In the formula for the taper of the transmission line, $x$ is the distance at any point from the reflecting end 13; L is the total length of the tapered portion 12, and $p$ is a number selected in accordance with the desired phase shift.

FIGURES 2a through 2c are cross sectional views of transmission line 10 of FIGURE 1 taken respectively along lines 2a, 2b, and 2c shown in FIGURE 1. In FIGURE 2a the width $w$ of the transmission line is at a maximum. The width tapers toward zero as shown by FIGURES 2b and 2c.

The acoustical transmission line is an effective phase shifter for a wide band of frequencies in the acoustic range; however, that band of frequencies is not without some limits. The upper limit on frequency is set by the requirement that the shortest wave length be large compared to the maximum width of the transmission line. With a 5:1 ratio as an arbitrary definition of "large," a one-half inch width allows two and one-half inches for the shortest usable wave length, or a frequency of about 5000 cycles per second. (The speed of sound in air is about 1100 feet per second.) The lower limit on frequency is set by the requirement that the rate of taper be not too abrupt. This can be stated quantitatively as follows. Looking at FIGURE 1, it may be seen that the tapered portion 12 tapers from $(\sin 0)^p$, where $x$ equals 0, to $$\left(\sin \frac{\pi}{2}\right)^p$$

where $x$ equals L. ($x$ equals 0 at reflecting end 13, and $x$ equals L at the junction of portions 11 and 12). Thus, the wave guide tapers through a quarter of the sine wave, or 90°, for the entire length L, and the term 4L may be considered as the "taper wave length." The lower limit requirement is met if the wave length of the lowest frequency, $\lambda_1$, is short compared with the "taper wave length." With 8:1 as an adequate ratio, and a value of fifty inches for L, $\lambda_1$ equals twenty-five inches and the lower frequency equals approximately 500 cycles per second. It is to be understood that these upper and lower frequencies are specified only by way of example.

Referring to the time graphs in FIGURE 3, the operation of the acoustical transmission line in FIGURE 1 will be explained. It should be stated at the outset that the acoustical transmission line is suitable for phase shifting only non-continuous signals, because for a continuous wave the portion traveling toward the reflecting end would interfere with the portion traveling from the reflecting end, and the interference would be detected at microphone 14. FIGURE 3a illustrates the signal introduced into input end 11 by loud-speaker 16. FIGURE 3b illustrates the signals which pass microphone 14. The arrows beneath the signals in FIGURE 3b indicate the direction of travel of the particular signal.

Loud-speaker 16 introduces a composite waveform signal $f(t)$ into the input portion 11 of acoustical transmission line 10. The signal $f(t)$ travels toward the reflecting end 13 of the transmission line and arrives at the junction of portions 11 and 12 at times $T_0$. This waveform is described by the formula $f(t-T_0)$ and is shown in FIGURE 3b.

The composite signal travels the length of tapered portion 12, is reflected at reflecting end 13, and travels back towards microphone 14. The signal arriving at microphone 14 has been further delayed by an amount equal to 2D, where D is the one-way delay time due to portion 12 of transmission line 10. This signal also has been phase shifted by an angle $\theta$ equal to $$p\frac{\pi}{2}$$

The composite wave is defined by the formula $$[f(t-T_0-2D)]_\theta$$

detected by microphone 14. The two remaining waveforms in FIGURE 3b indicate that the composite waveform continues to be reflected until it is either attenuated or absorbed completely.

In order to prevent the composite signal from being re-reflected at the input end by the loud-sepaker 16 after the desired signal is detected by microphone 14, an absorber (not shown) may be placed in the input portion 11 and positioned to absorb the signal after it travels back towards loudspeaker 16.

FIGURE 4 shows a slender rod transmission line for delaying and phase shifting a composite mechanical wave signal. Numeral 21 designates a crystal transducer which transmits longitudinal waves down the length of the transmission line in the same manner as loud-speaker 16 transmits sound waves down acoustical transmission line 10. The transmission line consists of an input end 18, a reflecting end 20, and a tapered portion 19 therebetween. A detector 22 is positioned at the junction of input end 18 and portion 19 and may be any type of detector which is capable of detecting reflected longitudinal waves, e.g., a strain-gage detector. The mechanical wave guide is similar in construction and operation to the acoustical wave guide shown in FIGURE 1, except that the mechanical wave guide is solid and the cross sectional area throughout portion 19 is tapered in accordance with the formula:

$$a_x = A\left[\sin\left(\frac{\pi}{2}\frac{x}{L}\right)\right]^p$$

where $a_x$ is the cross sectional area of tapered portion 19 at any point $x$ distance from reflecting end 20, A is the cross sectional area at the junction of portion 18 and 19, $x$ is the distance from the reflecting end 20, and L is the length of tapered portion 19.

The time graphs in FIGURE 3, which show the composite waveform at different times during the phase shifting operation, apply equally as well to the mechanical phase shifter shown in FIGURE 4.

As an example, if it is assumed that the rod is made of aluminum for which the speed of longitudinal waves is about 18,000 feet per second, then the mechanical phase shifter shown in FIGURE 4 would operate effectively for frequencies between 8,000 and 80,000 cycles per second to shift these frequencies by an angle $$\theta = p\frac{\pi}{2}$$

FIGURE 5 shows a further embodiment of my invention as applied to electrical transmission lines. For electrical transmission lines, the tapering is accomplished by varying electrical parameters or components rather than by varying dimensional components. The delay line comprises an input portion 26 and a tapered portion 27. The electrically tapered portion 27 is a lumped constant delay line made up of N inductance-capacitance sections. As shown in FIGURE 5, the first section ($n=1$) comprises an inductance $L_1$ and a capacitance $C_1$; the second section ($n=2$) comprises an inductance $L_2$ and a capacitance $C_2$; the $n^{th}$ section comprises an inductance $L_n$ and a capacitance $C_n$. In each section, the inductance $L_n$ is separated by connection to capacitor $C_n$ into two equal parts, $L_n/2$.

The values of the inductances and capacitances are chosen in accordance with the following formulae:

$$L_n = L_N\left(\sin\frac{\pi}{2}\frac{n}{N}\right)^p$$

$$\frac{1}{C_n} = \frac{1}{C_N}\left(\sin\frac{\pi}{2}\frac{n}{N}\right)^p$$

where:

$L_N$ = the value of the inductance of the $N^{th}$ section
$L_n$ = the value of the inductance of the $n^{th}$ section
$C_N$ = the value of the capacitance of the $N^{th}$ section
$C_n$ = the value of the capacitance of the $n^{th}$ section
N = the length, in sections, of the transmission line
$n$ = the distance, in sections, from the reflecting end of the transmission line = 1, 2 . . . N By varying the circuit parameters in this manner, a composite signal $f(t)$ applied to the input of the electrical transmission line will be delayed, reflected, and phase shifted by an angle equal to $$p\frac{\pi}{2}$$

The electrical transmission line, unlike the acoustical and mechanical transmission lines, is operable on continuous waves as well as non-continuous waves, because re-reflections of the input signal at the input end may be prevented by placing a resistance R equal to the characteristic impedance of the lumped constant transmission line in the input portion 26.

The operation of the electrical transmission line of FIGURE 5 may be explained with reference to FIGURE 5 and the time graphs of FIGURE 6. A composite signal $f(t)$ is applide at the input 23. This signal is shown in FIGURE 6a. The signal travels the length of the transmission line toward the reflecting end, is reflected, and travels the length of transmission line towards absorbing resistor R. The reflected signal $[f(t-2D)]_\theta$ where D equals the one-way delay time of portion 27, is detected after having been phase shifted an amount $\theta$ equal to $$p\frac{\pi}{2}$$

The detector consists of a voltage pick-off 24 and a current pick-off 25. The detected current $i$ is converted to a voltage $iR$ by any convenient means, such as a transformer with a proper resistive value in the secondary. The detected voltage $e$ is subtracted from the voltage $iR$ in a difference amplifier (not shown). This type of detector arrangement allows only the reflected signal to be detected as the input signal will subtract to zero. The input signal $f(t)=e+iR$ subtracts to zero because R equals the characteristic impedance of transmission line and therefore $e=iR$.

The electrical phase shifter of FIGURE 5 is not completely without limits in bandwidth for which it is operable. The period of the highest frequency signal must be considerably longer than the delay time per section of the transmission line. The period of the lowest frequency signal must be considerably shorter than four times the total delay in the transmission line. An example of the upper and lower frequency limits for which the delay line will give acceptably constant phase shifts are 300 to 5000 cycles per second.

The above-described acoustical, mechanical, and electrical phase shifters are satisfactory for phase shifting the frequencies of a composite wave equal amounts. However, for each desirable phase shift a new transmission line must be constructed.

A composite wave signal $f(t)$ may be variably phase shifted any amount $\theta$ by the following steps:

(1) Delay the signal $f(t)$ an amount equal to 2D to produce a signal $f(t-2D)$.

(2) Simultaneously with Step 1, delay the signal an amount equal to 2D and phase shift the resulting signal by 90° to produce a signal $$[f(t-2D)]\frac{\pi}{2}$$

(3) Multiply the signal derived from Step 1 by cosine $\theta$ and the signal derived from Step 2 by sine $\theta$ and add the resulting signals.

$$\cos\theta f(t-2D)+\sin\theta[f(t-2D)]\frac{\pi}{2}=[f(t-2D)]_\theta$$

Thus, it can be seen that the result is the original signal delayed and phase shifted by any angle $\theta$. By merely varying the multipliers cos $\theta$ and sin $\theta$, the phase shift angle $\theta$ may be varied. This result can be achieved by the use of two transmission lines of the acoustical, mechanical, or electrical type, and the additional circuitry shown in FIGURE 7.

If it is assumed that acoustical phase shifters are used, the two acoustical phase shifters are each of exactly the same length. The length provides a two-way transmission time of 2D.

The first transmission line is not tapered at all and the amount of phase shift imparted to a signal $f(t)$ would be zero. The detected signal from this phase shifter is $f(t-2D)$.

The second phase shifter has its width tapered in accordance with the formula $$\left(\sin\frac{\pi}{2}\frac{x}{L}\right)^1$$

The detected signal from this phase shifter is $$[f(t-2D)]\frac{\pi}{2}$$

The detected signals from the first and second phase shifters are multiplied respectively by the cosine and sine of $\theta$. Variable potentiometers, which are calibrated in terms of sine $\theta$ and cosine $\theta$, are suitable as multipliers. By summing the outputs of the multiplier, the desired signal $[f(t-2D)]_\theta$ is achieved. To change the phase shift, an operator need only vary the potentiometers.

In FIGURE 7, a signal $f(t)$ is applied at input 34 to transmission line 28 and 29. Transmission lines 28 and 29 may be of the electrical, acoustical, electromagnetic, or mechanical type. Transmission line 28 is designed, in accordance with my invention, to delay the signal by an amount 2D and impart a $\pi/2$ phase shift to the signal. Transmission line 29 is designed, in accordance with my invention, to delay the signal by an amount 2D and impart a 0° phase shift to the signal, i.e., no phase shift. The output $$f(t-2D)\frac{\pi}{2}$$

from transmission line 28 is multiplied by sin $\theta$ in variable multiplier 30, and the output $f(t-2D)$ from transmission line 29 is multiplied by cos $\theta$ in variable multiplier 31. Dotted line 22 indicates that multipliers 30 and 31 may be ganged together for purposes of having one control vary the angle $\theta$. The multipliers may be potentiometers. The outputs from multipliers 30 and 31 are summed in amplifier 33 which provides the desired output signal $[f(t-2D)]_\theta$.

Thus it can be seen that, by the modification shown in FIGURE 7, an operator need only turn a dial, or adjust the potentiometers, to achieve a desired phase shift. The above explanation of a variable phase shifter applies equally as well to electrical, electromagnetic, or mechanical transmission lines.

It will be obvious to those skilled in the art that the abovedescribed embodiments are meant to be merely exemplary and that they are susceptible of modification and variation within the spirit and scope of my invention. Therefore, the invention is not to be limited except as defined by the following claims.

I claim:

1. A system for phase shifting the component frequencies of a signal an equal amount without distorting the frequency spectrum of the signal comprising:
   (a) a transmission line having an input end, a reflecting end, and a portion therebetween,
   (b) means for applying said signal to said input end of said transmission line, and
   (c) means located near said input end for receiving said signal after reflection from said reflecting end,
   (d) said transmission line having a parameter which varies in accordance with the formula $$\left(\sin\frac{\pi}{2}A\right)^p$$

where $p$ is any number and A is a number which is directly proportional to the distance from the reflecting end, and (e) wherein the component frequencies of said signal are phase shifted by said transmission line an mount equal to $$\left(p\frac{\pi}{2}\right)$$

2. A system for phase shifting the frequencies of a composite signal an equal amount, comprising:
   (a) a reflecting transmission line,
   (b) means for applying to said reflecting transmission line a composite signal,
   (c) receiver means connected to said reflecting transmission line for receiving the composite signal reflected by said reflecting transmission line,
   (d) said transmission line having a parameter which varies in accordance with $$(\sin A)^p$$

where $p$ is any desired number and A is proportional to the distance from the reflecting end of the transmission line, and
   (e) wherein the component frequencies of said signal are phase shifted by said transmission line an amount equal to $$\left(p\frac{\pi}{2}\right)$$

3. A system for equally phase shifting the component frequencies of an acoustical signal, comprising:
   (a) a tapered acoustical transmission line having an input end, a reflecting end, and a portion therebetween,
   (b) means connected to said input end for transmitting said signal down said transmission line toward said reflecting end,
   (c) and means located near said input end for detecting the signal after reflection from said reflecting end,
   (d) said tapered transmission line varying in one dimension between said input end and said reflecting end in accordance with the formula $$\left(\sin\frac{\pi}{2}\frac{x}{L}\right)^p$$

where $p$ is a number chosen in accordance with the desired phase shift, L is the length of the transmission line, and $x$ is the distance to any point on the transmission line from the reflecting end.

4. A phase shifting system as claimed in claim 3 wherein said one dimension is width.

5. A phase shifting system as claimed in claim 3 wherein said one dimension is height.

6. A system for phase shifting the component frequencies of an acoustical signal an amount equal to $$\left(p\frac{\pi}{2}\right)$$

without distorting the relative amplitudes of said frequencies, comprising:
   (a) a hollow air-filled transmission line having an input end, a reflecting end, and a portion therebetween,
   (b) said transmission line having a width at each point between said input end and said reflecting end defined by the formula $$w_x = W\left(\sin\frac{\pi}{2}\frac{x}{L}\right)^p$$

where $p$ is any desired number, L is the length of the wave guide, W is the width at the input end where $x=L$, and $w_x$ is the width at any point a distance $x$ from the reflecting end, (c) means connected to said input end for applying an acoustical signal to said transmission line, and
   (d) means located at said input end for detecting the signal after reflecting from said reflecting end.

7. A system for equally phase shifting the component frequencies of a mechanical wave signal comprising:
   (a) a tapered metal rod having an input end, a reflecting end, and a portion therebetween,
   (b) means for applying said signal to the input end of said metal rod for transmission toward the reflecting end,
   (c) means coupled to said rod for receiving said signal after reflection from said reflecting end, and
   (d) wherein the cross sectional area of said metal rod is defined by the formula $$a_x = A\left(\sin\frac{\pi}{2}\frac{x}{L}\right)^p$$

where $p$ is any desired number, L is the length of the tapered metal rod, A is the cross sectional area of the rod at the input end, and $a_x$ is the cross sectional area of the rod at any point on the rod a distance $x$ from the reflecting end.

8. A system for phase shifting the component frequencies of a mechanical wave signal an amount equal to $$\left(p\frac{\pi}{2}\right)$$

without distorting the relative amplitudes of the frequencies comprising:
   (a) a slender metal rod whose cross section at any point between a first and second end is defined by the formula $$a_x = A\left(\sin\frac{\pi}{2}\frac{x}{L}\right)^p$$

where $p$ is any desired number, L is the length of the slender metal rod from said first end to said second end, A is the cross sectional area of the rod at said first end, and $a_x$ is the cross sectional area of the rod at a distance $x$ from said second end,
   (b) means for causing said signal to be transmitted from said first end towards said second end, and
   (c) means at said first end for receiving the signal reflected from said second end.

9. A phase shifter comprising
   (a) a lumped constant transmission line having an input end, a reflecting end, and a portion therebetween,
   (b) said portion consisting of N sections each having an inductance and a capacitance,
   (c) the value of each said inductance being defined by the formula $$L_n = L_N\left(\sin\frac{\pi}{2}\frac{n}{N}\right)^p$$

where $L_n$ is the inductance of the $n^{th}$ section, $n$ is the section 1, 2, 3 . . ., N, N is the total number of sections, $L_N$ is the value of the inductance of the section nearest said input end, and $p$ is any desired number,
   (d) the value of each said capacitance defined by the formula $$\frac{1}{C_n} = \frac{1}{C_N}\left(\sin\frac{\pi}{2}\frac{n}{N}\right)^p$$

where $C_N$ is the value of the capacitance of the section nearest the input end and $C_n$ is the value of the capacitance of the $n^{th}$ section.

10. The phase shifter as claimed in claim 9 further comprising
    (a) means for applying a signal to be phase shifted to the input end of said transmission line, and
    (b) means for detecting said signal after reflection from said reflecting end, 11. The phase shifter claimed in claim 10 further comprising a resistance at the input end for absorbing the energy of the reflected signal.

References Cited

UNITED STATES PATENTS

| 3,323,082 | 5/1967 | Kenneally | 333—34 |
| 3,050,701 | 8/1962 | Tang | 333—34 |
| 2,972,722 | 2/1961 | Ohm | 333—34 |
| 2,938,179 | 5/1960 | Ungar | 333—34 |

HERMAN KARL SAALBACH, Primary Examiner

C. BARAFF, Assistant Examiner

U.S. Cl. X.R.

181—.5; 328—155; 333—34, 70, 96

UNITED STATES PATENT OFFICE
CERTIFICATE OF CORRECTION

Patent No. 3,500,260                        March 10, 1970

James E. White

It is certified that error appears in the above identified patent and that said Letters Patent are hereby corrected as shown below:

Column 2, line 18, "specific" should read -- specified --. Column 4, line 2, "sepaker" should read -- speaker --; line 12, "wave" should read -- waves --. Column 5, line 18, "applide" should read -- applied --; line 41, "completedly" should read -- completely --. Column 6, line 37, "f(t-2D)" should read -- [f(t-2D)] --. Column 8, line 4, "reflecting" should read -- reflection --.

Signed and sealed this 15th day of September 1970.

(SEAL)
Attest:

Edward M. Fletcher, Jr.                  WILLIAM E. SCHUYLER, JR.
Attesting Officer                             Commissioner of Patents